United States Patent Office 3,274,209

Patented Sept. 20, 1966

1

3,274,209

CERTAIN 6-SUBSTITUTED-IMIDAZO [2,1-b] THIAZOLE COMPOUNDS

Alfons Herman Margaretha Raeymaekers, Beerse, near Turnhout, Denis Cyriel Irene Corneel Thienpont, Antwerp, and Paul Joseph Alfred Walter Demoen, Vosselaar, near Turnhout, Belgium, assignors to Janssen Pharmaceutica N.V., a corporation of Belgium No Drawing. Filed Apr. 7, 1965, Ser. No. 446,408

10 Claims. (Cl. 260—306.7)

This application is a continuation-in-part of copending application Serial No. 401,251, filed October 2, 1964, which in turn is a continuation-in-part application of Serial No. 387,231, filed August 3, 1964, which in turn is a continuation-in-part application of Serial No. 366,638, filed May 11, 1964, and all now abandoned.

This invention relates to new chemical compounds and generally to new derivatives of imidazo [2,1-b] thiazole having the formula:

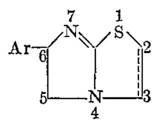

wherein the dotted line between the 2- anl 3-positions represents an optional bond, and Ar is a member selected from the group consisting of thienyl, furyl, phenyl and substituted phenyl in which said substituent is a member selected from the group consisting of halo, preferably chloro, bromo and fluoro, nitro, amino and trifluoromethyl; naphthyl, preferably α-naphthyl; and benzyl; provided that, when said Ar is benzyl, a saturated bond exists between the 2- and 3-positions of the imidazo [2,1-b] thiazole nucleus. Said substituted phenyl may bear one or more of the aforementioned substituents although, in the preferred compounds, the substituent is single and in the 3-position of the phenyl ring. The therapeutically acceptable acid addition salts of the foregoing compounds are also embraced within the scope of this invention.

2

If a double bond is present between the 2- and 3-positions, the respective compounds of this invention may be denoted as 5,6-dihydro-6-Ar-imidazo [2,1-b] thiazoles; and, when such double bond is absent, i.e., a saturated bond exists between the 2- and 3-positions, the respective compounds may be denoted as 2,3,5,6-tetrahydro-6-Ar-imidazo [2,1-b] thiazoles.

The novel compounds of this invention may be prepared for several methods as illustrated by the reactions shown in the following flow chart. Elevated temperatures may be advantageously employed during these reactions. Organic solvents of advantage in conducting the necessary reactions include 4-methyl - 2-pentanone, benzene, toluene, xylene, heptane, tetrahydrofuran, dioxane, ether and the like. Where appropriate, solvents such as lower alkanols may be used, e.g., ethanol, butanol, 2-propanol, etc.

A preferred method comprises reacting a compound of Formula I, in which Ar is other than benzyl, with a thiazoli(di)ne of Formula II to give a 3-substituted thiazoli(di)ne of Formula III which may then be reduced to the corresponding carbinols of Formula IV. This reduction is carried out with suitable reducing agents, such as an alkali metal borohydride, e.g., lithium, potassium or sodium borohydride, in the presence of a suitable organic solvent, such as, an ether, e.g., diethylether, diethylene glycol, tetrahydrofuran, etc., or an aliphatic alcohol, e.g., methanol, ethanol, 2-propanol, 2-butanol, and the like.

An alternative method of preparing the compounds represented by Formula IV comprises reacting a thiazoli(di)ne of Formula II with a compound of Formula VII. Acylation of these carbinols yields the corresponding compound of Formula V. The novel compounds VI of this invention may be obtained by ring closure of either of the compounds IV or V. Ring closure can be achieved by heating compounds IV or V with a suitable condensing agent, such as thionyl chloride, phosphoroxychloride, phosphorpentachloride, zinc chloride, polyphosphoric acid, etc., and, preferably, in the presence of a

FLOW CHART

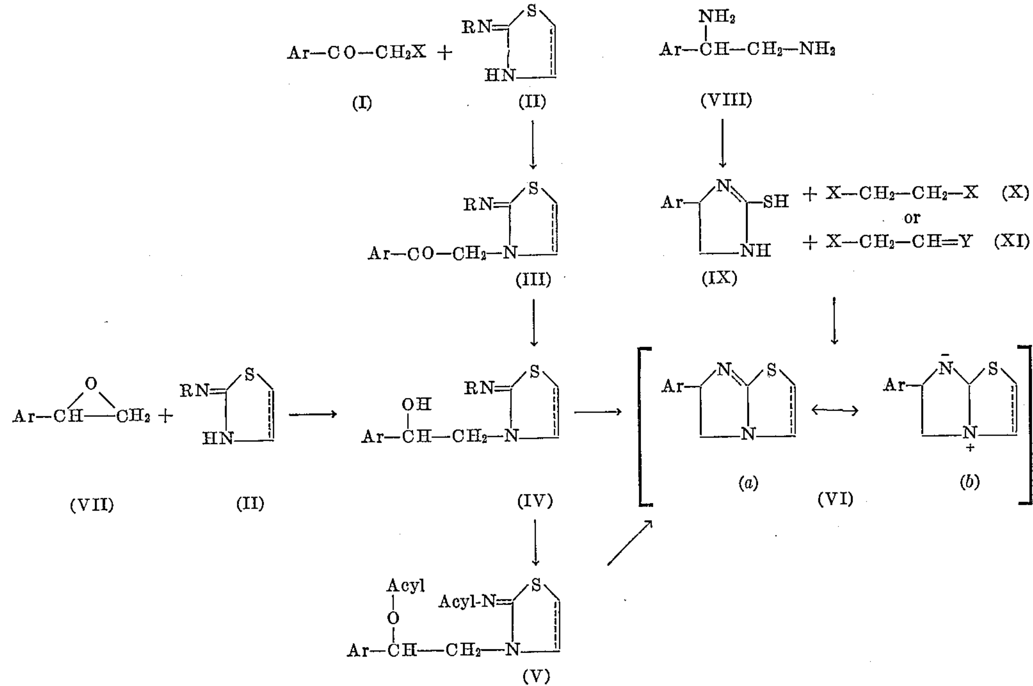

lower aliphatic acid anhydride, such as acetic anhydride, propionic anhydride and the like.

Alternatively, the compounds VI of this invention may be prepared by ring closure of an appropriately substiuted ethylene diamine represented by Formula VIII, in which Ar may be benzyl, to yield a corresponding 2-mercapto-imidazoline of Formula IX. This ring closure may be achieved with appropriate sulfur-containing reactants such as carbon disulfide, thiocyanic acid and the like. The resulting 2-mercapto-imidazoline (IX) is then treated with a compound of Formula X to yield the 2,3,5,6-tetrahydro-6-Ar-imidazo [2,1-b] thiazoles (VI) of this invention. The 5,6-dihydro-6-Ar-imidazo [2,1-b] thiazoles (VI) of this invention may be obtained by treating 2-mercapto-imidazoline (IX) with an acetaldehyde derivative of Formula XI.

As used in the foregoing reaction schemes, the dotted line represents an optional bond; the symbol Ar is as previously indicated; the symbol X represents a reactive ester of the corresponding alcohol with a strong inorganic or organic acid, such hydrochloric acid, hydrobromic acid, sulfuric acid, p-toluene-sulfuric acid, methane sulfuric acid and the like; the symbol Y represents oxygen or di-lower alkoxy and the symbol R represents a member selected from the group consisting of hydrogen and acyl, which acyl may be aliphatic or aromatic such as acetyl, propionyl, butyryl, benzoyl and the like, although acetyl is preferred.

Acylation of compounds III wherein R is hydrogen to yield the corresponding compounds wherein R is acyl may be accomplished by the usual acylation technique with appropriate acylating agents such as the anhydride of a lower aliphatic acid or an acyl halide, e.g., acetyl chloride, benzoyl chloride, etc. Similar acylation technique may be used in the acylation of compounds IV to compounds V.

An alternative method of preparing the subject compounds in which Ar is 6-(4-nitro-phenyl)- is by nitration of the corresponding 6-phenyl compounds, respectively. Subsequent reduction of the 6-(4-nitro-phenyl)- compound with suitable reducing agents as heretofore described, or by catalytic hydrogenation, yields the corresponding 6-(4-amino-phenyl) compound.

The subject compounds may be isolated at the free bases by synthetic processes normally employed. These compounds, in base form, are convertible to therapeutically active non-toxic acid addition salts by treatment with an appropriate acid, such as, for example, an inorganic acid, such as, hydrohalic acid, i.e., hydrochloric, hydrobromic, hydroiodic acid; sulfuric, nitric or thiocyanic acid; a phosphoric acid; and organic acid; such as acetic, propionic, glycolic, lactic, pyruvic, oxalic, malonic, succinic, maleic, fumaric, malic, tartaric, citric, benzoic, cinnamic, mandelic, methanesulfuric, ethanesulfuric, hydroxy-ethanesulfonic, benzene-sulfonic, p-toluenesulfonic, salicylic, p-aminosalicylic, 2-phenoxybenzoic or 2-acetoxybenzoic acid. Conversely, the salt form can be converted in the usual manner into the free base.

Without being bound to any theory whereby, it is believed that the ring nucleus of the subject bases may exist in the form exemplified by the structures VI*a* and VI*b* in the flow chart, whereas the acid addition salts may be exemplified by the following structure XIII:

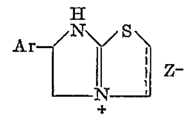

(XIII)

wherein $Z^-$ represents the salt anion. Such forms are intended to be within the scope of this invention.

The subject novel compounds are useful as anthelmintics and have been found to be particularly effective, for example, against *Ascaridia galli, Heterakis gallinae* and *Capillaria obsignata* in chickens; against lungworms in sheep and cattle, e.g., *Dictyocaulus filaria* and *Dictyocaulus viviparus;* against gastro-intestinal worms in sheep and cattle, e.g., *Haemoncus contortos,* Ostertagia spp., Trichostrongylus sp., Cooperia sp., *Nematodirus fillicolis,* Oesaphagostomum sp., *Strongyloides papillosus, Bunostomum trigonocephalum, Chabertia ovina* and *Trichuris ovis*; and against *Toxocara canis* and *Toxacaris leonina* in dogs.

Accordingly, this invention embraces methods of killing helminths which comprise treating infected subjects with an effective anthelmintic amount of the novel compounds described herein. For this purpose, from about 1 to about 160 milligrams per kilogram of body weight may be advantageously employed. Also included within the scope of this invention are anthelmintic compositions comprising an effective anthelmintic amount of the subject compounds in combination with suitable carriers.

The subject compounds can be used, for example, in the form of pharmaceutical and veterinarian preparations containing an anthelmintic amount of said compounds or salts thereof in admixture or conjunction with a suitable organic or inorganic, solid or liquid pharmaceutical carrier, such as, for example, water, gelatine, lactose, starch, magnesium sterate, talc, vegetable oils, gums, polyalkylene glycols, etc. The compositions are formulated by conventional methods and may be in any one of the conventional pharmaceutical forms, for example, for oral and parental administration, such as solutions, suspensions, emulsions, injectables, powders, slugs, granules, capsules, tablets and pellets, including unit dosage forms thereof, as well as other convenient forms which might be suitable for veterinarian or pharmaceutical use. They may be sterilized, for example, for parenteral administration, and/or may contain assistants such as conventional excipients, preserving, stabilizing, wetting, dispersing, disintegrating or emulsifying agents, fillers, buffers, bacteriostats, bactericidal agents, sporicidal agents, thickening agents, preservatives, coloring agents etc. They may also contain further veterinary or therapeutically useful substances, including, for example, other known anthelmintics such as pyrvinium pamoate, piperazine citrate, 2-$\beta$-methoxyethylpyridine and the like. The new compounds and the anthelmintic compositions thereof may also be used as additives and pre-mixes to animal feeds, drinking water, etc.

In such compositions and formulations, the concentration of the subject compounds should be at least about 0.01% by weight, preferably at least about 0.05%. The concentration of compound may range widely above these figures, depending on the form the composition takes, and indeed, in some cases the concentration of the compound may go as high as about 50%. The amount administered may also depend on the severity of the condition being treated or on the species being treated. Generally, the compositions per dosage unit may contain at least about 0.5 mg. of the subject imidazo [2,1-b] thiazoles and in some cases the amount per dosage unit may be as high as about 500 mg.

As mentioned above, compositions of the subject imidazo [2,1-b] thiazoles may also contain other drugs of known veterinary utility, for example, other anthelmintic agents such as the drug known as methyridine (2-$\beta$-methoxyethylpyridine), which is described and claimed per se in U.K. patent specification No. 889,748. Such compositions containing 2-$\beta$-methoxyethylpyridine are valuable for the removal of a wide range of worm infestations in sheep and cattle, are particularly effective against worm infestations containing members of the Trichuris sp., and may be formulated as described above so as to be suitable for either oral or parenteral administration.

For example, such compositions suitable for oral administration may be liquid or solid compositions. Suitable liquid compositions include, for example, aqueous concentrated solutions of the active ingredients, which solutions may optionally contain one or more buffers and/or stabilizing agents, for example sodium bisulfite, hydroxylamine or an acid-addition salt thereof, for example the hydrochloride. The liquid compositions also include, for example solutions in a vegetable oil, for example arachis oil, dimethylacetamide, poly-alkylene glycols. The solid compositions include tablets, slugs, pellets or capsules, which may be formulated using conventional excipients. Alternatively, the solid compositions may be in the form of dispersible compositions containing at least one adsorbent solid, for example fuller's earth or kieselguhr. The solid compositions may be in the form of pre-mix compositions suitable for addition to animal foodstuffs, or in the form of medicated animal foodstuff compositions, for example compositions comprising the active ingredients and animal foodstuffs. Compositions suitable for parenteral administration include, for example, sterile injectable aqueous and non-aqueous solutions or suspensions.

As preferred compositions containing the subject imidazo [2,1-b] thiazoles and 2-$\beta$-methoxyethylpyridine, there may be mentioned, for example, compositions containing between 50 and 200 parts by weight of 2-$\beta$-methoxyethylpyridine or a salt thereof, for example the hydrochloride, and 1.0–20 parts by weight of dl-6-phenyl-2,3,5,6-tetrahydro-imidazo [2,1-b] thiazole or a salt thereof, for example the hydrochloride. Such compositions may be formulated and administered in such a manner that there is administered a dose of 50–200 mg./kg. (of body-weight) of 2-$\beta$-methoxyethylpyridine or a salt thereof, for example the hydrochloride, and 1.0–20 mg./kg. (of body weight) of dl-6-phenyl-2,3,5,6-tetrahydro-imidazo [2,1-b] thiazole or a salt thereof, for example the hydrochloride.

The invention may be illustrated by, although not limited to, the following examples.

*Example I*

A mixture of 4 parts of 2-imino-thiazoline, 8.3 parts of bromo-methyl-2-thienyl-ketone and 40 parts of absolute ethanol is stirred and refluxed for 2 hours in a water-bath. After cooling, the precipitated hydrobromide is filtered off. From this salt the free base is liberated on treating with ammonium hydroxide solution and it is extracted with chloroform. The organic extract is separated, treated with activated charcoal, filtered and the filtrate is first dried over magnesium sulfate and then evaporated. The solid residue is recrystallized from 24 parts 2-propanol, to yield 2-imino-3-[(2-thienylcarbonyl)-methyl]-thiazoline; M.P. 117.5–118.5° C.

*Example II*

A mixture of 4 parts of 2-imino-3-[(2-thienyl-carbonyl)-methyl]-thiazoline, 50 parts of acetic anhydride and 1.15 parts of sodium acetate is stirred and refluxed for 15 minutes. The formed sodium bromide is filtered off. From the filtrate, the excess of acetic anhydride is distilled and the residual solid is recrystallized from 2-propanol. The solid is filtered off and dried in vacuo, yielding 2-(acetyl-imino)-3-[(2-thienyl-carbonyl)-methyl]-thiazoline; M.P. 146–147.5° C.

*Example III*

To a stirred mixture of 13 parts of 2-(acetyl-imino)-3-[(2-thienyl-carbonyl)-methyl]-thiazoline hydrobromide and 64 parts of ethanol are added portionwise 3 parts of sodium borohydride (exothermic reaction). After the addition is complete, the whole is stirred and refluxed for one hour. The solvent is evaporated. The solid residue is dissolved in hydrochloric acid 4 N. After keeping at room temperature, it crystallizes again. The solid is filtered off and dissolved in water. The aqueous solution is rendered alkaline with ammonium hydroxide and extracted with chloroform. The chloroform extract is dried over magnesium sulfate and evaporated. The solid residue is recrystallized twice: first from 4-methyl-2-pentanone and once more from 400 parts of water. After drying in vacuo, dl-2-(acetyl-imino)-3-[2-hydroxy-2-(2-thienyl)-ethyl]-thiazoline is obtained; M.P. 132.5–133° C.

*Example IV*

A solution of 2 parts of dl-2-(acetyl-imino)-3-[2-hydroxy-2-(2-thienyl)-ethyl]-thiazoline in 16 parts of thionylchloride and 45 parts chloroform is stirred and refluxed for one hour. After cooling the whole is extracted with water. The acid aqueous solution is separated, washed with toluene, alkalized with ammonium hydroxide solution and extracted with chloroform. The extract is dried over magnesium sulfate and evaporated. The oily residue is dissolved in 40 parts boiling 2-propanol. To this warm solution is added a warm solution of an equivalent quantity of oxalic acid dihydrate in 2-propanol. After cooling to room temperature, the precipitated oxalate is filtered off and dried in vacuo, yielding dl-5,6-dihydro-6-(2-thienyl)-imidazo [2, 1-b]-thiazole oxalate; M.P. 192–193° C.

*Example V*

A mixture of 6 parts dl-2-(acetyl-imino)-3-[2-hydroxy-2-(2-thienyl)-ethyl]-thiazoline and 80 parts phosphoroxychloride is heated in a water-bath for 2 hours at a temperature of 100° C. After cooling, the reaction mixture is poured into water. The whole is alkalized with ammonium hydroxide solution and extracted with toluene. The extract is dried over magnesium sulfate and evaporated in vacuo. The oily residue is dissolved in 40 parts boiling 2-propanol. To this warm solution is added a warm solution of an equivalent quantity of oxalic acid dihydrate in 2-propanol. After cooling to room temperature, the precipiated salt is filtered off and dried in vacuo, yielding dl-5,6-dihydro-6-(2-thienyl)-imidazo [2, 1-b] thiazole oxalate; M.P. 193–194° C.

An aqueous solution of this salt is alkalized with ammonium hydroxide and extracted with toluene. The extract is dried over magnesium sulfate and evaporated. The oily residue is crystallized from 12 parts xylene. The solid is filtered off and dried in vacuo, yielding dl-5,6-dihydro-6-(2-thienyl)-imidazo [2, 1-b] thiazole; M.P. 58–62° C.

*Example VI*

To a solution of 1.2 parts of dl-5,6-dihydro-6-(2-thinyl)-imidazo [2, 1-b] thiazole in 24 parts acetone is added a slight excess of a solution of hydrogen chloride in 2-propanol. The oily precipitate solidifies on seeding with the solid hydrochloride salt and scratching. The salt is filtered off and dried, to yield dl-5,6-dihydro-6-(2-thienyl)-imidazo [2, 1-b] thiazole hydrochloride; M.P. 159–160.5° C.

*Example VII*

To a solution of 1.2 parts dl-5,6-dihydro-6-(2-thienyl)-imidazo [2, 1-b] thiazole in 24 parts acetone is added an excess of hydrobromic acid in 2-propanol. Upon saturation, the solvent is decanted and the oily residue is recrystallized from 20 parts dimethylformamide. The solid salt is filtered off and dried in vacuo, yielding dl-5,6-dihydro-6-(2-thienyl)-imidazo [2, 1-b] thiazole hydrobromide; M.P. 163–164° C.

*Example VIII*

To a solution of 1.2 parts dl-5,6-dihydro-6-(2-thienyl)-imidazo [2, 1-b] thiazole in 24 parts acetone is added an excess of phosphoric acid in acetone. The solvent is decanted from the oily precipitate, which is then crystallized from 20 parts dimethylformamide. The solid salt is filtered off and dried in vacuo, yielding dl-5,6-dihydro-6-(2-thienyl)-imidazo [2, 1-b] thiazole phosphate; M.P. 184–185° C.

*Example IX*

To a solution of 0.42 part of dl-5,6-dihydro-6-(2- thienyl)-imidazo [2, 1-b] thiazole in 20 parts ether is added a solution of 0.235 part maleic acid in 4 parts ethanol, whereupon a precipitate is formed gradually. After standing for about 18 hours in a refrigerator the solid is filtered off and dried, yielding dl-5,6-dihydro-6-(2-thienyl)-imidazo [2, 1-b] thiazole maleate; M.P. 109.2–110.8° C.

*Example X*

To a solution of 0.42 part of dl-5,6-dihydro-6-(2-thienyl)-imidazo [2, 1-b] thiazole in 20 parts ether is added a solution of 0.21 part malonic acid in 4 parts ethanol, whereupon a precipitate is formed gradually. After standing for about 18 hours in a refrigerator, the solid is filtered off and dried, yielding dl-5,6-dihydro-6-(2-thienyl)-imidazo [2, 1-b] thiazole malonate; M.P. 95.6–97.4° C. (dec.).

*Example XI*

A mixture of 12 parts of 2-imino-thiazoline, 23.5 parts of bromo-methyl-2-furyl-ketone and 160 parts of 3-propanol is stirred while heating in an oil-bath for 15 minutes at 100° C. After cooling, the formed precipitate is filtered off and dried in vacuo, yielding 2-imino-3-[(2 - furyl - carbonyl) - methyl] - thiazoline hydrobromide; M.P. 198–198.5° C.

*Example XII*

A mixture of 55 parts of 2-imino-3-[(2-furyl-carbonyl)-methyl]-thiazoline hydrobromide, 300 parts of acetic anhydride and 25 parts of sodium acetate is stirred and refluxed for 15 minutes. The excess acetic anhydride is evaporated. The solid residue is alkalized with ammonium hydroxide and extracted with chloroform. The whole is boiled with activated charcoal, filtered and the filtrate is evaporated. The solid residue is recrystallized from 160 parts of 4-methyl-2-pentanone. The solid is filtered off and dried, yielding 2-(acetyl-imino)-3-[(2-furyl-carbonyl)-methyl]-thiazoline; M.P. 142.5–143.5° C.

*Example XIII*

To a suspension of 20 parts of 2-(acetyl-imino)-3-[(2-furyl-carbonyl)-methyl]-thiazoline in 160 parts of ethanol are added portionwise 3.1 parts of sodium borohydride (exothermic reaction). After the addition is complete, the whole is stirred and refluxed for one hour. The solvent is evaporated. The solid residue is decomposed with diluted hydrochloric acid. The obtained solution is alkalized with ammonium hydroxide solution, whereupon a solid is formed. It is filtered off and recrystallized from 80 parts of toluene, yielding dl-2-(acetyl-imino) - 3 - [2 - (2 - furyl) - 2 - hydroxy - ethyl] - thiazoline; M.P. 115–116.5° C.

*Example XIV*

A solution of 8 parts dl-2-(acetyl-imino)-3-[2-(2-furyl)-2-hydroxy-ethyl]-thiazoline in 12.8 parts of thionyl chloride and 120 parts of chloroform is stirred and refluxed for one hour. After cooling, the whole is extracted with water. The acid aqueous solution is separated, washer with toluene, alkalized with ammonium hydroxide solution and extracted with toluene. The extract is dried over magnesium sulfate and evaporated. The oily residue is dissolved in boiling 2-propanol. To this hot solution is added a warm solution of an equivalent quantity of oxalic acid dihydrate in 2-propanol. After cooling to room temperature, the precipitated salt is filtered off and dried in vacuo, yielding dl-5,6-dihydro-6-(2-furyl)-imidazo [2, 1–b] thiazole oxalate; M.P. 166–173° C. (dec.).

*Example XV*

A mixture of 21 parts of 2-imino-3-(benzoyl-methyl)-thiazoline hydrobromide, 200 parts of acetic anhydride and 8 parts sodium acetate is stirred and refluxed for one hour. The excess of acetic anhydride is evaporated.

The residue is alkalized with ammonium hydroxide solution 10%. The formed solid is filtered off and recrystallized from 90 parts toluene, yielding 2-(acetyl-imino)-3-(benzoyl-methyl)-thiazoline; M.P. 153–154° C.

*Example XVI*

To a solution of 15 parts of 2-(acetyl-imino)-3-(benzoyl-methyl)-thiazoline in 100 parts of ethanol are added portionwise 2.7 parts sodium borohydride (slightly exothermic reaction). After the addition is complete, the whole is stirred and refluxed for one hour. The solvent is evaporated. The solid residue is decomposed with hydrochloric acid and filtered. The filtrate is alkalized with ammonium hydroxide solution, whereupon a precipitate is formed. It is filtered off (filtrate is set aside) and recrystallized from 80 parts 2-propanol, filtered off again and dried, yielding a first fraction of dl-2-(acetyl-imino)-3-($\beta$-hydroxy-phenethyl)-thiazoline; M.P. 157–159° C.

The filtrate (which was set aside) is concentrated to half its volume. After cooling to 0° C., the formed precipitate is filtered off and dried, yielding a second fraction of dl-2-(acetyl-imino)-3-($\beta$-hydroxy-phenethyl)-thiazoline; M.P. 158–159° C.

*Example XVII*

A solution of 4 parts of dl-2-(acetyl-imino)-3-($\beta$-hydroxy-phenethyl)-thiazoline in 6.4 parts thionyl chloride and 60 parts chloroform is stirred and refluxed for 2 hours. After cooling the whole is extracted with water. The acid layer is washed with toluene, alkalized with ammonium hydroxide solution and extracted with chloroform. The extract is dried over magnesium sulfate and evaporated. The oily residue is dissolved in 8 parts boiling 2-propanol. To this hot solution is added a warm solution of an equivalent quantity of oxalic acid dihydrate in 2-propanol. After cooling to room temperature, the salt is filtered off and dried, yielding dl-5,6-dihydro-6-phenyl-imidazo [2,1-b] thiazole oxalate; M.P. 185.5° C. (dec.).

*Example XVIII*

To a mixture of 75 parts of dl-2-imino-3-($\beta$-hydroxy-phenethyl)-thiazoline hydrobromide and 184 parts of thionylchloride are added carefully 600 parts of acetic anhydride, while cooling in an ice-bath. When a homogenous mixture is obtained, the cooling-bath is removed and the whole is stirred and refluxed for 10 minutes. Then the second part of 96 parts of thionyl chloride is added portionwise and the whole is stirred and refluxed for another 30 minutes. The formed acetylchloride is distilled off (internal temperature: 137° C.). The residue is evaporated in vacuo. The residue is dissolved in a mixture of 800 parts of water and 80 parts of concentrated hydrochloric acid. After standing for 30 minutes, the mixture is filtered from some insoluble matter and the filtrate is alkalized with 200 parts of ammonium hydroxide and then extracted with toluene (successively: 120, 80 and 80 parts). The combined extracts are dried over magnesium sulfate, filtered, washed with 120 parts toluene and the filtrate is evaporated in vacuo. The residue is dissolved in a boiling mixture of 32 parts 2-propanol and 16 parts hexane. To this hot solution is added a hot solution of 31 parts oxalic acid dihydrate in 40 parts 2-propanol. After cooling to 4° C., the solid salt is filtered off, washed on the filter with 2-propanol and dried, yielding dl-5,6-dihydro-6-phenyl-imidazo [2,1-b] thiazole oxalate; M.P. 186.8–187.5° C. (dec.).

*Example XIX*

From 25.2 parts of dl-$\beta$-amino-phenethyl-amine dihydro-chloride the free base is liberated as follows: 25.2 parts dl-$\beta$-amino-phenethyl-amine dihydrochloride are dissolved in 40 parts water. This solution is alkalized with 9.6 parts of sodium hydroxide and extracted with ethanol. The precipitated sodium chloride is filtered off and to the filtrate are added 8.15 parts carbon disulfide (exothermic reaction). The mixture is stirred and refluxed for one hour in an oil-bath. Then there is added one part concentrated hydrochloric acid and the mixture is further stirred and refluxed for 10 hours. The reaction mixture is stirred overnight at room temperature. The precipitated product is filtered off, washed with water and acetone and dried, yielding dl-2-thio-4-phenyl-imidazolidine; M.P. 194–195.5° C.

To a solution of sodium ethoxide, prepared in the usual manner starting from 0.46 part of sodium in 80 parts of ethanol, are added 3.6 parts of dl-2-thio-4-phenyl-imidazolidine. After the addition is complete, the whole is stirred and refluxed for 15 minutes. Then there are added 3.1 parts of chloroacetaldehyde-diethylacetal. The mixture is stirred and refluxed for one hour. After cooling, the ethanol is evaporated. To the residue are added 28 parts of concentrated hydrochloric acid and the unreacted starting material is filtered off. After refluxing the filtrate for one hour, the hydrochloric acid is evaporated. The residue is redissolved in 20 parts of water. The aqueous solution is alkalized with ammonium hydroxide and extracted with chloroform. The extract is dried and evaporated. The residue is dissolved in 20 parts boiling 2-propanol. To this hot solution is added a warm solution of an equivalent quantity of oxalic acid dihydrate in 20 parts of 2-propanol. After cooling to room temperature, the precipitated oxalate salt is filtered off and recrystallized from 40 parts of boiling 2-propanol. After cooling, the solid oxalate is filtered off, washed successively with 2-propanol and ether, and dried, yielding dl-5,6-dihydro-6-phenyl-imidazo [2,1-b] thiazole oxolate; M.P. 183–184.5° C.

*Example XX*

A mixture of 62 parts of dl-2-(acetyl-imino)-3-(β-hydroxy-phenethyl)-thiazoline and 208 parts of phosphoroxychloride is boiled for 1 h. 50 in a boiling water-bath. After cooling the reaction mixture is poured into a mixture of water and crushed ice. The whole is alkalized with ammonium hydroxide and extracted with toluene. The extract is dried over magnesium sulfate and evaporated. The oily residue is dissolved in 40 parts acetone and gaseous hydrogen chloride is introduced into the solution. The precipitated salt is filtered off and dried, yielding dl-5,6-dihydro-6-phenyl-imidazo [2,1-b] thiazole hydrochloride; M.P. 175–177° C.

*Example XXI*

137 parts of dl-5,6-dihydro-6-phenyl-imidazo [2,1-b] thiazole oxalate are dissolved in a mixture of 1500 parts of water and 100 parts of concentrated hydrochloric acid, while stirring. The solution is filtered over hyflo and the filtrate is alkalized with ammonium hydroxide and extracted several times with chloroform (successively: 375, 225 and 150 parts). The combined extracts are dried over magnesium sulfate and evaporated. The residue is dissolved in 150 parts 2-propanol and gaseous hydrogen chloride is introduced into the solution. The precipitated salt is filtered off and dried in vacuo, yielding dl-5,6-dihydro-6-phenyl-imidazo [2,1-b] thiazole hydrochloride; M.P. 174–176.5° C.

*Example XXII*

A mixture of 36.6 parts of 3-nitro-phenacylbromide, 15 parts of 2-amino-thiazole and 160 parts of 2-propanol is stirred and refluxed for one hour (water-bath). After cooling the reaction mixture, the formed precipitate is filtered off, washed with 2-propanol and dried, yielding 2-imino-3-(3-nitro-benzoyl-methyl)-thiazoline hydrobromide; M.P. 245–309° C. (dec.).

*Example XXIII*

A mixture of 45 parts of 2-imino-3-(3-nitro-benzoyl-methyl)-thiazoline hydrobromide, 350 parts of acetic anhydride and 14 parts of anhydrous sodium acetate is stirred and refluxed for 2 hours. The reaction mixture is cooled, filtered and the filtrate is evaporated. The oily residue is washed with 400 parts ammonium hydroxide solution 10% and extracted with chloroform. The extract is dried over sodium sulfate, filtered and evaporated. The oily residue is triturated in acetone. The solid is recrystallized from 120 parts toluene, filtered off and dried, yielding 2-(acetyl-imino)-3-(3-nitro-benzoyl-methyl)-thiazoline; M.P. 151–152° C.

*Example XXIV*

To a stirred mixture of 13 parts of 2-(acetyl-imino)-3-(3-nitro-benzoyl-methyl)-thiazoline in 200 parts absolute denatured ethanol are added portionwise 4.5 parts of sodium borohydride. After the addition is complete, the whole is stirred and refluxed for one hour. After cooling the solvent is evaporated. The residue is decomposed with 300 parts diluted hydrochloric acid. The solution is filtered and alkalized with ammonium hydroxide solution and then extracted with chloroform. The extract is dried over sodium sulfate, filtered and evaporated. The oily residue is boiled in a mixture of 80 parts of benzene and 20 parts acetone. After cooling to room temperature, the precipitated solid is filtered off and dried, yielding dl-2-(acetyl-imino)-3-(β-hydroxy-3-nitro-phenethyl)-thiazoline; M.P. 138.5–154° C. (dec.).

*Example XXV*

24 parts of thionyl chloride are cooled to a temperature of 0° C. While maintaining a temperature between 0–5° C., there are added 7 parts of dl-2-(acetyl-imino)-3-(β-hydroxy-3-nitro-phenethyl)-thiazoline. After the addition is complete, the whole is stirred for 2 hours at room temperature. Then there are added 75 parts of acetic anhydride at a temperature below 20° C. The formed acetyl chloride is distilled off (oil-bath) temperature 136° C. The residue is evaporated. The oily residue is dissolved in 100 parts of hydrochloric acid 10%. The solution is filtered and the filtrate is alkalized with ammonium hydroxide solution and extracted with toluene. The extract is dried over sodium sulfate, filtered and evaporated. The oily residue is dissolved in 20 parts of boiling 2-propanol. To this hot solution is added a warm solution of 1 part of oxalic acid dihydrate in 20 parts of 2-propanol. After cooling to room temperature, the precipitated salt is filtered off, washed with acetone and dried, yielding dl-5,6-dihydro-6-(3-nitro-phenyl)-imidazo[2,1-b] thiazole oxalate; M.P. 192–195° C.

*Example XXVI*

A mixture of 41.7 parts of 3-bromo-phenacylbromide, 15 parts of 2-amino-thiazole and 200 parts of 2-propanol is stirred and refluxed for one hour in a water-bath. After cooling the reaction mixture to room temperature, the formed precipitate is filtered off, washed first with 2-propanol and then with boiling methanol, yielding 2-imino-3-(3-bromo-benzoyl-methyl)-thiazoline hydrobromide; M.P. 203–205° C.

*Example XXVII*

To a stirred and cooled (0° C.) solution of 36 parts of 2-imino-3-(3-bromo-benzoyl-methyl)-thiazoline hydrobromide in 200 parts of methanol are added portionwise 7.6 parts of sodium borohydride, while keeping the temperature between 0–5° C. After the addition is complete, the whole is stirred for one hour at room temperature. The precipitated solid is filtered off and the filtrate is evaporated. The combined solids are stirred for 10 minutes in 80 parts of a 25% hydrobromic acid solution. The precipitate is filtered off, washed with 2-propanol and dried, yielding dl-2-imino-3-(β-hydroxy-3-bromo-phenethyl)-thiazoline hydrobromide; M.P. 245.5–247° C.

*Example XXVIII*

A mixture of 15 parts of dl-2-imino-3-(β-hydroxy-3-bromo-phenethyl)-thiazoline hydrobromide, 24 parts of thionyl chloride and 115 parts acetic anhydride is stirred and refluxed for 30 minutes in an oil-bath. Then a second portion of 19 parts of thionyl chloride is added and the whole is stirred and refluxed for a further 30 minutes. The formed acetyl chloride is distilled off in an oil-bath at a temperature of 150–160° C. in the course of about 2 hours. The residue is evaporated. The oily residue is dissolved in a mixture of 300 parts of water and 30 parts of concentrated hydrochloric acid. This solution is boiled for a few minutes with activated charcoal, filtered hot and after cooling the filtrate to room temperature, a solid is precipitated. It is filtered off (filtrate is set aside) and dried, yielding dl-2-(acetyl-imino)-3-(β-acetoxy-3-bromo-phenethyl)-thiazoline hydrochloride; M.P. 143.5–149° C.

The filtrate which was set aside is alkalized with ammonium hydroxide solution and extracted with toluene. The extract is dried over sodium sulfate, filtered and evaporated. The oily residue is dissolved in acetone and this solution is evaporated again. The solid residue is recrystallized from a mixture of 64 parts benzene and 40 parts petroleum ether, to yield dl-2-(acetyl-imino)-3-(β-hydroxy-3-bromo-phenethyl)-thiazoline; M.P. 151–152° C.

*Example XXIX*

24 parts of thionyl chloride are stirred and cooled to 0° C. While maintaining the temperature below 10° C., there are added portionwise 7 parts of dl-2-(acetyl-imino)-3-(β-hydroxy-3-bromo-phenethyl) - thiazoline. The mixture is stirred for 2 hours at room temperature. Then there are added 75 parts of acetic anhydride at a temperature below 15° C. The formed acetyl chloride is distilled off (oil-bath-temperature: 130° C.). The solvent is evaporated. The oily residue is dissolved in a mixture of 150 parts of water and 15 parts of hydrochloric acid. The whole is stirred for a few minutes with activated charcoal and filtered. The filtrate is alkalized with ammonium hydroxide and extracted with toluene. The extract is dried over sodium sulfate, filtered and evaporated. The oily residue is dissolved in 60 parts of boiling 2-propanol. This solution is filtered hot and to the warm filtrate is added a hot solution of 1.8 parts of oxalic acid dihydrate in 20 parts of 2-propanol. The precipitated salt is filtered off, washed with acetone and dried, yielding dl - 5,6 - dihydro - 6 - (3 - bromo - phenyl) - imidazo[2,1-b]thiazole oxalate; M.P. 153–155° C.

*Example XXX*

A mixture of 17.5 parts of 3-chloro-phenacylbromide, 7.5 parts of 2-amino-thiazole and 120 parts of acetonitrile is stirred and heated (water-bath) for one hour. After cooling the precipitated product is filtered off and dried, yielding 2-imino-3-(3-chloro-benzoyl-methyl) - thiazoline hydrobromide; M.P. 215–216° C.

*Example XXXI*

A mixture of 15 parts of 2-imino-3-(3-chloro-benzoyl-methyl)-thiazoline hydrobromide, 13.8 parts of acetic anhydride, 13.8 parts of pyridine and 275 parts of chloroform is stirred and refluxed for 6 hours. After cooling the reaction mixture is washed with ammonium hydroxide solution. The organic layer is separated, dried and evaporated. The oily residue is crystallized from toluene, yielding 2-(acetyl-imino)-3-(3-chloro - benzoyl - methyl)-thiazoline; M.P. 145–147° C.

*Example XXXII*

To a stirred and cooled (0° C.) solution of 8 parts of 2-(acetyl-imino)-3-(3-chloro-benzoyl-methyl)-thiazoline in 80 parts of methanol are added portionwise 1.14 parts sodium borohydride at a temperature below 5° C. After the addition is complete, the whole is stirred for one hour at room temperature. The precipitated solid is filtered off and dried, yielding a first fraction of dl-2-(acetyl-imino) - 3 - (β - hydroxy - 3 - chloro - phenethyl) - thiazoline; M.P. 142–143° C.

The filtrate is evaporated. The residue is decomposed with water and extracted with chloroform. The extract is dried over sodium sulfate, filtered and evaporated. The solid residue is triturated in toluene, yielding a second fraction of dl-2-(acetyl-imino)-3-(β-hydroxy-3-chloro-phenethyl)-thiazoline; M.P. 140–141° C.

*Example XXXIII*

To 16 parts of thionyl chloride are added 6 parts of dl - 2 - (acetyl-imino)-3-(β-hydroxy-3-chloro-phenethyl)-thiazoline at a temperature below 10° C. and while stirring. After the addition is complete, the whole is stirred for 2 hours at room temperature. Then there are added 50 parts of acetic anhydride at a temperature below 15° C. The formed acetyl chloride is distilled off, whereafter the whole is stirred and refluxed for 2 hours. The mixture is evaporated. The residue is dissolved in 100 parts of water and 10 parts of hydrochloric acid are added. The whole is filtered. The filtrate is alkalized with ammonium hydroxide solution and extracted with toluene. The solvent is dried over sodium sulfate, filtered and evaporated. The oily residue is dissolved in 60 parts of boiling 2-propanol. To this hot solution is added a warm solution of 3 parts of oxalic acid dihydrate in 40 parts of 2-propanol. After cooling to room temperature, the precipitated oxalate salt is filtered off, washed with acetone and dried, yielding dl-5,6-dihydro-6-(3-chloro-phenyl) - imidazo[2,1 - b]thiazole oxalate; M.P. 155–157° C.

*Example XXXIV*

A mixture of 38 parts of bromo-methyl-2-thienyl-ketone, 14.3 parts of 2-amino-4,5-dihydro-thiazole and 120 parts of acetonitrile is stirred and heated in a water-bath for 1 h. 30. After cooling, the precipitated product is filtered off, washed on the filter with acetonitrile and dried, yielding 2-amino-3-[(2-thienyl-carbonyl)-methyl]-thiazolidine hydrobromide; M.P. 213–213.5° C.

*Example XXXV*

A mixture of 19 parts of 2-imino-3-[(2-thienyl-carbonyl)-methyl]-thiazolidine hydrobromide, 12.8 parts of acetic anhydride, 25.5 parts of dry pyridine and 520 parts dry chloroform is stirred and refluxed for 6 hours. After cooling the solution is filtered. The filtrate is washed with ammonium hydroxide solution, dried over sodium sulfate, filtered and evaporated. The solid residue is recrystallized from 56 parts of toluene, yielding 2-(acetyl-imino) - 3 - [(2-thienyl-carbonyl)-methyl]-thiazolidine; M.P. 145.5–147° C.

*Example XXXVI*

To a cooled (0° C.) and stirred solution of 8.5 parts of 2 - (acetyl - imino)-3-[(2-thienyl-carbonyl)-methyl]-thiazolidine in 80 parts of methanol are added portionwise 1.3 parts of sodium borohydride, while keeping the temperature below 5° C. After the addition is complete, the whole is stirred for one hour at room temperature. The reaction mixture is evaporated. The solid residue is decomposed with water and extracted with chloroform. The extract is dried over sodium sulfate, filtered and evaporated. The oily residue is triturated in acetone. The solid is filtered off and dried, yielding dl-2-(acetyl - imino) - 3 - [2 - hydroxy - 2-(2-thienyl)-ethyl]-thiazolidine; M.P. 85.5–88° C.

*Example XXXVII*

5 parts of dl - 2 - (acetyl - imino)-3-[2-hydroxy-2-(2-thienyl)-ethyl]-thiazolidine are added to 15.4 parts of thionyl chloride at a temperature below 10° C. After the addition is complete, the whole is stirred for one hour at room temperature. Then there are added dropwise 50 parts of acetic anhydride. The formed acetyl chloride is distilled off, whereupon the whole is stirred and refluxed for 2 hours. The mixture is evaporated. The residue is dissolved in 100 parts of water. To this solution is added 10 parts of hydrochloric acid. The whole is boiled with activated charcoal and filtered. The filtrate is alkalized with ammonium hydroxide and extracted with toluene. The extract is dried and evaporated. The oily residue is dissolved in acetone and gaseous hydrogen chloride is introduced into the solution. The precipitated salt is filtered off and dried, yielding dl-2,3,5,6-tetrahydro-6-(2-thienyl)-imidazo[2,1-b]thiazole hydrochloride; M.P. 216–220° C.

*Example XXXVIII*

A mixture of 19 parts of bromo-methyl-2-furyl-ketone, 10.2 parts of 2-amino-4,5-dihydro-thiazole and 80 parts of acetonitrile is stirred and heated in a water-bath for 1 h. 30. After cooling the reaction mixture, the precipitated product is filtered off, washed with acetonitrile and dried, yielding 2 - imino - 3 - [(2-furyl-carbonyl)-methyl]-thiazolidine hydrobromide; M.P. 202–203° C.

*Example XXXIX*

A mixture of 2 parts of 2-imino-3-[(2-furyl-carbonyl)-methyl]-thiazolidine hydrobromide, 3.5 parts of acetic anhydride, 3.5 parts of dry pyridine and 30 parts of dry chloroform is stirred and refluxed for 6 hours. After cooling the reaction mixture is washed with ammonium hydroxide solution. The organic layer is separated, dried and evaporated. The oily residue is dissolved in 16 parts of warm toluene. The solution is cooled to room temperature. The solid is filtered off and recrystallized from toluene, yielding 2-(acetyl-imino)-3-[(2-furyl-carbonyl)-methyl]-thiazolidine; M.P. 132–135° C.

*Example XL*

To a solution of 9 parts of 2-(acetyl-imino)-3-[(2-furyl-carbonyl)-methyl]-thiazolidine in 80 parts of methanol are added portionwise 1.8 parts of sodium borohydride at a temperature of 0° C. After the addition is complete, the whole is stirred for one hour at room temperature. The reaction mixture is evaporated. The oily residue is dissolved in chloroform. This solution is washed with water, dried and evaporated. The oily residue is triturated in toluene. After keeping at room temperature, the solid is filtered off and dried, yielding dl-2-(acetyl-imino)-3-[2-hydroxy-2-(2-furyl)-ethyl]-thiazolidine; M.P. 110.5–112° C.

*Example XLI*

6 parts of dl - 2 - (acetyl - imino)-3-[2-hydroxy-2-(2-furyl)-ethyl]-thiazolidine are added portionwise to 14.4 parts of thionyl chloride at a temperature below 10° C. After the addition is complete, the mixture is stirred for 2 hours at room temperature. Then there are added dropwise 50 parts of acetic anhydride. The formed acetyl chloride is distilled off, whereafter the mixture is stirred and refluxed for 2 hours. The mixture is evaporated. The oily residue is dissolved in 100 parts of water and 10 parts of hydrochloric acid are added. The whole is boiled with activated charcoal and filtered. The filtrate is alkalized with ammonium hydroxide and extracted with toluene. The extract is dried over magnesium sulfate and evaporated. The oily residue is dissolved in 20 parts of 2-propanol. To this boiling solution is added a hot solution of 3.1 parts of oxalic acid dihydrate in 20 parts of 2-propanol. After cooling to room temperature, the precipitated salt is filtered off, yielding dl-2,3,5,6-tetra-hydro - 6 - (2-furyl)-imidazo[2,1-b]thiazole oxalate; M.P. 176–176.5° C.

*Example XLII*

From an aqueous solution of dl-2,3,5,6-tetrahydro-6-(2-furyl)-imidazo[2,1-b]thiazole oxalate, the free base is liberated in the usual manner. After extraction with toluene, the extract is dried and evaporated. The oily residue is dissolved in acetone and gaseous hydrogen chloride is introduced into the solution. The precipitated hydrochloride is filtered off and dried, yielding dl-2,3,5,6-tetra-hydro-6-(2-furyl)-imidazo[2,1-b]thiazole hydrochloride; M.P. 206.5–209° C.

*Example XLIII*

To a solution of 5.1 parts of 2-amino-4,5-dihydro-thiazole in 40 parts of acetonitrile are added portionwise 10 parts of phenacyl-bromide (exothermic reaction). After the addition is complete, the mixture is stirred and refluxed for 30 minutes in a water-bath. After cooling the precipitated solid is filtered off and dried, yielding 2-imino - 3 - (benzoyl - methyl)-thiazolidine hydrobromide; M.P. 200° C. (dec.).

*Example XLIV*

A mixture of 6 parts of 2-imino-3-(benzoyl-methyl)-thiazolidine hydrobromide, 3.4 parts of acetic anhydride, 3.4 parts of dry pyridine and 60 parts of dry chloroform is stirred and refluxed for 6 hours. After cooling the reaction mixture is washed with ammonium hydroxide solution. The organic layer is separated, dried over magnesium sulfate and evaporated. The solid residue is recrystallized from toluene, yielding 2-(acetyl-imino)-3-(benzoyl-methyl)-thiazolidine; M.P. 140–141° C.

*Example XLV*

To a solution of 3.4 parts of 2-(acetyl-imino)-3-(benzoylmethyl)-thiazolidine in 24 parts of methanol are added portionwise 0.5 part of sodium borohydride at a temperature between 5–10° C. After the addition is complete, the whole is stirred for one hour at room temperature. The reaction mixture is evaporated. The residue is dissolved in water. The solution is extracted with chloroform. The extract is dried, and evaporated. The solid residue is recrystallized from toluene, yielding dl-2-(acetyl-imino)-3-($\beta$-hydroxy-phenethyl)-thiazoldine; M.P. 100–103.5° C.

*Example XLVI*

25.6 parts of thionyl chloride are cooled to 10° C. While maintaining this temperature there are added portionwise 11 parts of dl-2-(acetyl-imino)-3-($\beta$-hydroxy-phenethyl)-thiazolidine. The mixture is stirred for 2 hours at room temperature. After cooling to 10° C., there are added 5 parts of acetic anhydride. After the addition is complete, the formed acetyl chloride is distilled off, whereafter the mixture is stirred and refluxed for 2 hours. The whole is evaporated. The residue is dissolved in a mixture of 20 parts of hydrochloric acid and 200 parts of water. The solution is filtered, cooled and alkalized with ammonium hydroxide. The separated free base is extracted with toluene. The obtained solution is dried and evaporated. The oily residue is dissolved in 40 parts of boiling 2-propanol. To this hot solution is added a warm solution of 6 parts of oxalic acid dihydrate in 40 parts of 2-propanol. After cooling the precipitated salt is filtered off and dried, yielding dl-2,3,5,6-tetrahydro-6-phenyl-imidazo [2,1-b] thiazole oxalate; M.P. 195.5–196° C.

*Example XLVII*

From 6 parts of dl-2,3,5,6-tetrahydro-6-phenyl-imidazo [2,1-b] thiazole oxalate the free base is liberated in a conventional manner and extracted with toluene. After drying, the organic solution is evaporated. The oily residue is dissolved in 80 parts of acetone and gaseous hydrogen chloride is introduced into the solution. The precipitated hydrochloride salt is filtered off and dried, yielding dl-2,3,5,6-tetrahydro-6-phenyl-imidazo [2,1-b] thiazole hydrochloride; M.P. 261.5–264.5° C.

*Example XLVIII*

To a stirred and refluxed suspension of 17 parts of 1,2-dibromoethane, 7.8 parts of sodium hydrogen carbonate and 50 parts of 2-propanol is added a mixture of 3.4 parts of dl-2-thio-4-phenyl-imidazolidine. 9 parts of a 20% potassium hydroxide solution in 40 parts of 2-propanol over a period of about one hour. After the addition is complete, the whole is stirred and refluxed for an additional 3 hours. The reaction mixture is evaporated. To the residue are added 18 parts of a 15% potassium hydroxide solution. The whole is extracted with toluene. The extract is dried and evaporated. The oily residue is dissolved in acetone and gaseous hydrogen chloride is introduced into the solution. The precipitated solid salt is filtered off and recrystallized from 2-propanol, yielding dl-2,3,5,6-tetrahydro-6-phenyl-imidazo [2,1-b] thiazole hydrochloride; M.P. 264–266° C.

*Example XLIX*

From an aqueous solution of 1.2 parts of dl-2,3,5,6-tetrahydro-6-phenyl-imidazo [2,1-b] thiazole hydrochloride the free base is liberated in the usual manner. After extraction with chloroform, the extract is dried and evaporated. The oily residue is crystallized from 4-methyl-2-pentanone, to yield dl-2,3,5,6-tetrahydro-6-phenyl-imidazo [2,1-b] thiazole; M.P. 90–92° C.

*Example L*

To a solution of 18.3 parts of 3-nitro-phenacylbromide in 80 parts of acetonitrile are added portionwise 7.75 parts of 2-amino-4,5-dihydro-thiazole (exothermic reaction). After the addition is complete, the mixture is stirred for 30 minutes without heating. The precipitated product is filtered off and dried, yielding 2-imino-3-(3-nitro-benzoyl-methyl)-thiazolidine hydrobromide; M.P. +300° C. (dec.).

*Example LI*

A mixture of 20 parts of 2-imino-3-(3-nitro-benzoyl-methyl)-thiazolidine hydrobromide, 11.5 parts of acetic anhydride, 11.5 parts of dry pyridine and 225 parts of dry chloroform is stirred an refluxed overnight. After cooling the reaction mixture is washed with ammonium hydroxide solution. The organic layer is separated, dried and evaporated. The oily residue is crystallized from a mixture of toluene and heptane, yielding 2-(acetyl-imino)-3-(3-nitro-benzoyl-methyl)-thiazolidine; M.P. 116–145° C. (dec.).

*Example LII*

To a suspension of 7 parts of 2-(acetyl-imino)-3-(3-nitro-benzoyl-methyl)-thiazolidine in 24 parts of methanol are added portionwise 0.86 parts of sodium borohydride. After the addition is complete, the whole is stirred for 2 hours at room temperature. The formed precipitate is filtered off, triturated in water and extracted with chloroform. The extract is dried and evaporated. The oily residue is crystallized in toluene, yielding dl-2-(acetyl-imino) - 3 - (β-hydroxy-3-nitro-phenethyl)-thiazolidine; M.P. 122–140° C.

*Example LIII*

To 16 parts of thionyl chloride are added 4 parts of dl - 2-(acetyl-imino)-3-(β-hydroxy-3-nitro-phenethyl)-thiazolidine at a temperature below 10° C., while stirring. After the addition is complete, the whole is stirred for 2 hours at room temperature. Then there are added 40 parts of acetic anhydride. The formed acetyl chloride is distilled off, whereafter the mixture is stirred and refluxed for 2 hours. The mixture is evaporated. The residue is dissolved in a mixture of 100 parts of water and 10 parts of hydrochloric acid. The solution is filtered. The filtrate is alkalized with ammonium hydroxide solution and extracted with toluene. The extract is dried and evaporated. The oily residue is dissolved in 40 parts of boiling 2-propanol. To this hot solution is added a warm solution of 2.5 parts of oxalic acid dihydrate in 16 parts of 2-propanol. After cooling to room temperature, the precipitated oxalate salt is filtered off and washed with acetone, to yield dl-2,3,5,6-tetrahydro-6-(3-nitro-phenyl)-imidazo [2,1-b] thiazole oxalate; M.P. 183–184° C.

*Example LIV*

To a solution of 21 parts of 3-bromo-phenacylbromide in 60 parts of acetonitrile is added dropwise a solution of 7.6 parts of 2-amino-4,5-dihydro-thiazole in 60 parts of acetonitrile. After the addition is complete, the whole is stirred for one hour at room temperature. The precipitated product is filtered off and dried, yielding 2-imino-3 - (3-bromo-benzoyl-methyl)-thiazolidine hydrobromide; M.P. 252–253.5° C.

*Example LV*

A mixture of 21 parts of 2-imino-3-(3-bromo-benzoyl-methyl)thiazolidine hydrobromide, 16.8 parts of acetic anhydride, 16.8 parts of dry pyridine and 275 parts of dry chloroform is stirred and refluxed for 6 hours. After cooling, the reaction mixture is washed with ammonium hydroxide solution. The organic layer is separated, dried and evaporated. The oily residue is dissolved in 2-propanol and gaseous hydrogen chloride is introduced into the solution. The precipitated salt is filtered off and dried, yielding 2 - (acetyl-imino)-3-(3-bromo-benzoyl-methyl)-thiazolidine hydrochloride; M.P. 162–165° C.

*Example LVI*

To a suspension of 9 parts of 2-(acetyl-imino)-3-(3-bromo-benzoyl-methyl)-thiazolidine hydrochloride in 80 parts of methanol are added 1.81 parts of sodium borohydride at a temperature between 0–5° C. After the addition is complete, the whole is stirred for one hour at room temperature. The reaction mixture is filtered from a solid precipitate and the filtrate is evaporated. The solid residue, together with the solid product which is filtered off, is triturated in water and the mixture is extracted with chloroform. The extract is dried and evaporated. The oily residue is crystallized in toluene, to yield dl-2-(acetyl-imino) - 3 - (β-hydroxy-3-bromo-phenethyl)-thiazolidine; M.P. 141.5–142.5° C.

*Example LVII*

To 16 parts of thionyl chloride are added 4.5 parts of dl - 2 - (acetyl-imino)-3-(β-hydroxy 3-bromo-phenethyl)-thiazolidine at a temperature below 10° C. while stirring. After the addition is complete, the whole is stirred for 2 hours at room temperature. Then there are added dropwise 50 parts of acetic anhydride at a temperature below 15° C. After the addition is complete, the formed acetyl chloride is distilled off, whereafter the mixture is stirred and refluxed for 2 hours. The reaction mixture is evaporated. The residue is dissolved in a mixture of 100 parts of water and 10 parts of hydrochloric acid. The solution is filtered. The filtrate is alkalized with ammonium hydroxide solution and extracted with toluene. The extract is dried over sodium sulfate and evaporated. The oily residue is dissolved in acetone and gaseous hydrogen chloride is introduced into the solution. The precipitated salt is filtered off and dried, yielding dl-2,3,5,6 - tetrahydro - 6-(3-bromo-phenyl)-imidazo[2,1-b] thiazole hydrochloride; M.P. 194–195.5° C.

*Example LVIII*

To a solution of 23.5 parts of 3-chloro-phenacylbromide in 120 parts of acetonitrile are added 10.2 parts of 2-amino-4,5-dihydro-thiazole. After the addition is complete, the whole is stirred for 30 minutes. The formed precipitate is filtered off and dried, yielding 2-imino-3-(3-chloro-benzoyl - methyl) - thiazolidine hydrobromide; M.P. 276–277° C. (dec.).

*Example LIX*

A mixture of 25 parts of 2-imino-3-(3-chloro-benzoyl-methyl)-thiazolidine hydrobromide, 15.5 parts of acetic anhydride, 15.5 parts of dry pyridine and 300 parts of dry chloroform is stirred and refluxed overnight. After cooling the reaction mixture is washed with ammonium hydroxide solution. The organic layer is separated, dried and evaporated. The oily residue is crystallized in a mixture of toluene and heptane, yielding 2-(acetyl-imino)-3-(3-chloro-benzoyl-methyl)-thiazolidine; M.P. 90.5–91° C.

*Example LX*

To a stirred and cooled (0° C.) solution of 10 parts of 2 - (acetyl - imino)-3-(3-chloro-benzoyl-methyl)-thiazolidine in 120 parts of methanol are added portionwise 1.52 parts of sodium borohydride at a temperature below 5° C. After the addition is complete, the whole is stirred for one hour at room temperature. The solvent is evaporated. The residue is decomposed with water and extracted with chloroform. The extract is dried over sodium sulfate, filtered and evaporated. The oily residue is crystallized in toluene, yielding dl-2-(acetyl-imino)-3-(β-hydroxy-3-chloro-phenethyl)-thiazolidine; M.P. 138–139° C.

*Example LXI*

To 16 parts of thionyl chloride are added 7 parts of dl - 2 - (acetyl-imino)-3-(β-hydroxy-3-chloro-phenethyl)-thiazolidine at a temperature below 10° C. After the addition is complete, the whole is stirred for 2 hours at room temperature. Then there are added 50 parts of acetic anhydride at a temperature below 15° C. The formed acetyl chloride is distilled off, whereafter the reaction mixture is stirred and refluxed for 2 hours. The mixture is evaporated. The residue is dissolved in a mixture of 10 parts of hydrochloric acid and 100 parts of water. The solution is filtered. The filtrate is alkalized with ammonium hydroxide and extracted with toluene. The extract is dried over sodium sulfate, filtered and evaporated. The oily residue is dissolved in 40 parts of boiling 2-propanol. To this hot solution is added a warm solution of 3 parts of oxalic acid dihydrate in 40 parts of 2-propanol. After cooling to room temperature, the precipitated oxalate is filtered off, washed with acetone and dried, yielding dl-2,3,5,6-tetrahydro-6-(3-chloro-phenyl) - imidazo[2,1 - b]thiazole oxalate; M.P. 168–171° C.

*Example LXII*

Thirteen chickens infected with *Ascaridia galli* and *Heterakis gallinae* and having an average body weight of 1.5 kilograms, are given about 40 mg./kg. of body weight of dl-2,3,5,6-tetrahydro-6-phenyl-imidazo[2,1-b]thiazole hydrochloride by the following oral routes: in gelatin capsules (7 chickens), in drinking water (3 chickens) and mixed with feed (3 chickens). The total output of faeces is collected every day for a period of four days and washed. The expelled worms in the faeces are collected by sieving, identified and counted. After the fourth day, the chickens are sacrificed and autopsied. The various internal organs of the digestive tract (e.g., stomach, duodenum, ilium, colon, etc.) are examined for the presence of worms. A total absence of worms is observed.

In accordance with the above procedure, similar results are obained (wherein from about 75–100 percent expulsion of worms are observed), with dl-2,3,5,6-tetrahydro-6-(2-thienyl)-imidazo[2,1-b] thiazole hydrochloride,
dl-2,3,5,6-tetrahydro-6-(3-chloro-phenyl)-imidazo [2,1-b]thiazole oxalate,
dl-2,3,5,6-tetrahydro-6-(3-bromo-phenyl)-imidazo [2,1-b]thiazole hydrochloride,
dl-2,3,5,6-tetrahydro-6-(3-nitro-phenyl)-imidazo [2,1-b]thiazole oxalate,
dl-5,6-dihydro-6-phenyl-imidazo[2,1-b]thiazole hydrochloride,
dl-5,6-dihydro-6-(2-thienyl)-imidazo[2,1-b]thiazole hydrochloride, and
dl-5,6-dihydro-6-(3-bromo-phenyl)-imidazo[2,1-b] thiazole oxalate.

*Example LXIII*

Adult sheep, infected with a variety of worms, are given oral dosages of various anthelmintics in the quantities listed below. The amount of worms in the faeces and those remaining in the digestive tract of the killed sheep are determined as in Example LXII.

The results obtained are given in the following table, wherein:

$A$=number of worms expelled in faeces.
$B$=number of worms remaining in digestive tract.

$$\text{Percent}=\frac{A}{A+B}\times 100$$

Compound I=dl - 2,3,5,6 - tetrahydro - 6-phenyl-imidazo [2,1-b]thiazole hydrochloride.
Compound II=dl - 5,6-dihydro-6-phenyl-imidazo[2,1-b] thiazole hydrochloride.
Compound III=dl - 5,6 - dihydro - 6-(2-thienyl)-imidazo [2,1-b]thiazole hydrochloride.

TABLE I

COMPOUND I

| No. of sheep | Dose mg./kg. | Worm count | | | | | | | | | | | |
|---|---|---|---|---|---|---|---|---|---|---|---|---|---|
| | | Trichostrongylus | | | Ostertagia | | | Haemoncus | | | Nematodirus | | |
| | | A | B | % | A | B | % | A | B | % | A | B | % |
| 2 | 40 | 2,165 | 0 | 100 | 605 | 0 | 100 | | | | 7,538 | 0 | 100 |
| 2 | 20 | 40,888 | 56 | 100 | 1,376 | 0 | 100 | | | | 918 | 0 | 100 |
| 2 | 10 | 12,928 | 1 | 100 | 120 | 0 | 100 | | | | 10,204 | 0 | 100 |
| 1 | 2.5 | 4,145 | 4,245 | 50 | | | | | | | | | |

| No. of sheep | Dose mg./kg. | Worm count | | | | | | | | | | | |
|---|---|---|---|---|---|---|---|---|---|---|---|---|---|
| | | Strongyloides | | | Bunostomum | | | Chabertia | | | Trichuris | | |
| | | A | B | % | A | B | % | A | B | % | A | B | % |
| 2 | 40 | 4,625 | 0 | 100 | 17 | 11 | 60 | 182 | 0 | 100 | 7 | 0 | 100 |
| 2 | 20 | 3,252 | 88 | 98 | 28 | 2 | 93 | 145 | 1 | 99 | 105 | 31 | 60 |
| 2 | 10 | 25,356 | 3 | 100 | 137 | 34 | 80 | 245 | 0 | 100 | 5 | 5 | 50 |
| 1 | 2.5 | | | | 42 | 1 | 98 | 23 | 2 | 91 | 0 | 4 | 0 |

COMPOUND II

| No. of sheep | Dose mg./kg. | Worm count | | | | | | | | | | | |
|---|---|---|---|---|---|---|---|---|---|---|---|---|---|
| | | Trichostrongylus | | | Ostertagia | | | Haemoncus | | | Nematodirus | | |
| | | A | B | % | A | B | % | A | B | % | A | B | % |
| 2 | 40 | 4,359 | 0 | 100 | | | | | | | 11,060 | 0 | 100 |
| 1 | 10 | 5,581 | 0 | 100 | | | | | | | 7,364 | 0 | 100 |
| 1 | 2.5 | | 6 | 0 | | 12 | 0 | 245 | 1 | 99 | | | |

TABLE I—*Continued*

| No. of sheep | Dose mg./kg. | Worm count | | | | | | | | | | | |
|---|---|---|---|---|---|---|---|---|---|---|---|---|---|
| | | Strongyloides | | | Bunostomum | | | Chabertia | | | Trichuris | | |
| | | A | B | % | A | B | % | A | B | % | A | B | % |
| 2 | 40 | 184 | 2 | 99 | 332 | 0 | 100 | 176 | 0 | 100 | 24 | 0 | 100 |
| 2 | 10 | | | | | | | 12 | 0 | 100 | | 2 | 0 |
| 1 | 2.5 | | 1 | 0 | | | | 4 | 5 | 45 | | 2 | 0 |

COMPOUND III

| No. of sheep | Dose mg./kg. | Worm count | | | | | | | | | | | |
|---|---|---|---|---|---|---|---|---|---|---|---|---|---|
| | | Trichostrongylus | | | Ostertagia | | | Haemoncus | | | Nematodirus | | |
| | | A | B | % | A | B | % | A | B | % | A | B | % |
| 2 | 40 | 874 | 1 | 100 | | | | | | | 7,516 | 0 | 100 |
| 2 | 10 | 3,866 | 2 | 100 | | | | | | | | | |

| No. of sheep | Dose mg./kg. | Worm count | | | | | | | | | | | |
|---|---|---|---|---|---|---|---|---|---|---|---|---|---|
| | | Strongyloides | | | Bunostomum | | | Chabertia | | | Trichuris | | |
| | | A | B | % | A | B | % | A | B | % | A | B | % |
| 2 | 40 | 91 | 1 | 99 | 47 | 0 | 100 | 87 | 1 | 98 | 0 | 2 | 0 |
| 2 | 10 | 496 | 202 | 70 | 90 | 3 | 96 | 65 | 0 | 100 | | 34 | 0 |

*Example LXIV*

Adult sheep, infected with *Dictyocaulus viviparus* and young cattle infected with *Dictyocaulus filaria* are given oral dosages of various anthelmintics in the quantities listed below.

The infection rate is determined by counting the Dictyocaulus larvae found in the faeces obtained over a 24 hour-period.

The treated animals are divided in three groups:

(1) In the first group the animals have been tracheotomised before treatment and a plastic bag is fixed in the tracheotubus to collect the expelled animals. After the fourth day the animals are sacrificed and autopsied. The lungs are examined for the presence of worms, which are identified and counted.

(2) In the second group the effectiveness of the treatment is determined by identifying and counting the amount of larvae of Dictyocaulus, present in the faeces obtained over a 24 hour-period before treatment and in the faeces obtained over a 4 day-period after treatment.

(3) In the third group the animals are treated as described for the second group. At the end of the experiment, the animals are sacrificed and autopsied. The lungs are then examined for the presence of worms.

The results obtained are given in the following table, wherein:

$A$=number of larvae per gram faeces before treatment (1 day).

$B$=number of larvae per gram faeces after treatment (4 days).

$$\text{Percent } (L)=\frac{A}{A+B}\times 100$$

$C$=number of worms expelled in plastic bag.
$D$=number of worms remaining in the lungs.

$$\text{Percent } (W)=\frac{C}{C+D}\times 100$$

Compound I=dl-2,3,5,6-tetrahydro-6-phenyl-imidazo [2, 1-b] thiazole hydrochloride.

Compound II=dl-5,6-dihydro-6-(2-thienyl)-imidazo [2,1-b] thiazole hydrochloride.

Group 1, Group 2, Group 3, as identified above.

TABLE II

COMPOUND I

| Animal species | Number of animals | Dose mg./kg. | Larvae count/gr faeces | | | Worm Count | | | Group |
|---|---|---|---|---|---|---|---|---|---|
| | | | A | B | (L) Percent | C | D | (W) Percent | |
| Sheep | 1 | 40 | 1,900 | 0 | 100 | | 0 | 100 | 3 |
| Do. | 2 | 20 | 200 | 0 | 100 | | 1 | ? | 3 |
| Calf | 2 | 40 | 12 | 0 | 100 | | | | 2 |
| COMPOUND II | | | | | | | | | |
| Sheep | 3 | 50 | 940 | 0 | 100 | 303 | 0 | 100 | 1 |
| Do. | 3 | 30 | 1,720 | 0 | 100 | 550 | 8 | 98 | 1 |

*Example LXV*

To a solution of 11.5 parts 2-chloro-acetophenone in 120 parts chloroform are added dropwise 4 parts bromine. After the addition is complete, the whole is stirred for one hour at room temperature. The chloroform layer is washed with a sodium hydrogen carbonate solution, dried over sodium sulfate, filtered and to the filtrate are added 7.5 parts 2-amino-4,5-dihydro-thiazole and 120 parts acetonitrile. The whole is stirred for 30 minutes at room temperature. The formed precipitate is filtered off, washed with acetonitrile and dried, yielding 2-imino-3-(2-chlorobenzoyl-methyl)-thiazolidine hydrobromide; M.P. 197–198° C.

A mixture of 15 parts 2-imino-3-(2-chloro-benzoyl-methyl)-thiazolidine hydrobromide, 15 parts acetic anhydride, 15 parts dry pyridine and 225 parts dry chloroform is stirred and refluxed for 6 hours. After cooling the reaction mixture is alkalized with ammonium hydroxide solution. The chloroform layer is separated, dried over sodium sulfate, filtered and evaporated. The oily residue is crystallized from 64 parts toluene, yielding 2-(acetyl-imino) - 3 - (2-chloro-benzoyl-methyl)-thiazolidine; M.P. 116–116.5° C.

To a suspension of 8 parts 2-(acetyl-imino)-3-(2-chloro-benzyl-methyl)-thiazolidine in 120 parts methanol are added 1.5 parts sodium tetrahydridoborate at a temperature below 5° C. After the addition is complete, the whole is stirred for one hour at room temperature. The formed precipitate is filtered off and dried, yielding dl-2-(acetyl-imino)-3-(β-hydroxy-2-chloro-phenethyl)-thiazolidine; M.P. 163–164° C.

To 16 parts thionylchloride are added 5.5 parts dl-2-(acetyl-imino)-3-(β-hydroxy-2-chloro-phenethyl)-thiabolidine at a temperature below 10° C., while stirring. After the addition is complete, the whole is stirred for 2 hours at room temperature. Then there are added 50 parts acetic anhydride at a temperature below 15° C. The whole is stirred and refluxed for 2 hours, while the formed acetylchloride is distilled off (oil-bath: temperature about 136° C.). The mixture is evaporated. The residue is dissolved in a mixture of 100 parts water and 10 parts hydrochloric acid. The solution is filtered. The filtrate is alkalized with ammonium hydroxide solution and extracted with toluene. The extract is dried and evaporated. The oily residue is dissolved in 40 parts boiling 2-propanol. To this hot solution is added a warm solution of 2 parts oxalic acid dihydrate in 20 parts 2-propanol. After cooling to room temperature, a semi-solid oxalate is precipitated. The 2-propanol is evaporated. The oily residue is crystallized from acetone, to yield dl-2,3,5,6-tetrahydro-6-(2-chloro-phenyl)-imidazo [2,1-b] thiazole oxalate; M.P. 157–170° C. (dec.).

*Example LXVI*

From an aqueous solution of 1.25 parts dl-2,3,5,6-tetrahydro-6-phenyl-imidazo [2,1-b] thiazole hydrochloride, the free base is liberated by treatment with ammonium hydroxide. After extraction with chloroform, the extract is dried and evaporated. The oily residue is crystallized from 4-methyl-2-pentanone, to yield dl-2,3,5,6-tetrahydro-6-phenyl-imidazo [2,1-b] thiazole; M.P. 90–92° C., which is then converted in the usual manner to the corresponding nitrate.

A mixture of 6 parts of dl-2,3,5,6-tetrahydro-6-phenyl-imidazo [2,1-b] thiazole nitrate and 110 parts of sulphuric acid is stirred for 5 days at room temperature. Then the mixture is poured onto crushed ice. The whole is alkalized with ammonium hydroxide solution and then extracted with chloroform. The extract is dried over magnesium sulfate and evaporated. The oily residue is dissolved in 120 parts toluene and to this solution is added 2-propanol previously saturated with gaseous hydrogen chloride. The precipitated solid is filtered off and recrystallized from 40 parts of ethanol, yielding dl-2,3,5,6-tetrahydro-6-(4-nitro-phenyl)-imidazo [2,1-b] thiazole hydrochloride; M.P. 203.5–206° C. (dec.).

*Example LXVII*

A mixture of 31 parts of bromomethyl-4-fluoro-phenyl-ketone, 14.5 parts of 2-amino-4,5-dihydro-thiazole and 120 parts of acetonitrile is stirred for one hour at room temperature. The precipitated product, 2-imino-3-(4-fluoro-benzoyl-methyl)-thiazolidine hydrobromide, is filtered off, washed on the filter with acetone and dried; M.P. 209–210° C.

A mixture of 37 parts of 2-imino-3-(4-fluoro-benzoyl-methyl)-thiazolidine hydrobromide, 40.8 parts of acetic anhydride, 40.8 parts of dry pyridine and 750 parts of dry chloroform is stirred and refluxed for 14 hours. After cooling the reaction mixture is washed successively with diluted ammonium hydroxide solution and with water. The chloroform is dried over magnesium sulfate, filtered and evaporated. The solid residue is recrystallized from 56 parts of toluene, yielding 2-(acetyl-imino)-3-(4-fluoro-benzoyl-methyl)-thiazolidine; M.P. 126–127° C.

To a cooled (0° C.) and stirred suspension of 24 parts of 2-(acetyl-imino)-3-(4-fluoro-benzoyl-methyl)-thiazolidine in 400 parts of methanol is added portionwise 6.5 parts of sodium borohydride. After the addition is complete, the cooling-bath is removed and the whole is stirred for one hour at room temperature. The solvent is evaporated. The residue is divided between water and chloroform. The chloroform layer is dried over sodium sulfate, filtered and evaporated. The oily residue is crystallized from 40 parts of toluene, filtered off and dried, yielding dl-2-(acetylimino) - 3 - (β - hydroxy-4-fluoro-phenethyl)-thiazolidine; M.P. 118–121° C.

To a stirred solution of 15 parts of dl-2-(acetyl-imino)-3-(β-hydroxy-4-fluoro-phenethyl)-thiazolidine in 60 parts of dry chloroform is added dropwise 6.8 parts of thionylchloride at a temperature of 30° C. After the addition is complete, the whole is stirred for one hour at 30° C. Then there is added dropwise a solution of 21.9 parts of potassium carbonate in 40 parts of water at room temperature and after the addition is complete, the whole is further stirred for one hour at room temperature, followed by stirring and refluxing for 1 hr. 30 min. After cooling there is added 100 parts of water. The chloroform layer is separated, dried over potassium carbonate, filtered and evaporated. The oily residue is dissolved in 16 parts of 2-propanol. To this solution is added 2-propanol previously saturated with gaseous hydrogen chloride. The precipitated product is filtered off and recrystallized from 2-propanol, to yield dl-2,3,5,6-tetrahydro-6-(4-fluoro-phenyl)-imidazo [2,1-b] thiazole hydrochloride; M.P. 249–252° C.

*Example LXVIII*

A mixture of 49 parts of bromomethyl-1-naphthyl-ketone, 20.4 parts of 2-amino-4,5-dihydro-thiazole and 120 parts of acetonitrile is stirred for 1 hr. 30 min. at room temperature. The precipitated product is filtered off, washed with acetone and dried, yielding 2-imino-3-(1 - naphthoylmethyl)-thiazolidine hydrobromide; M.P. 192–202° C.

A mixture of 31 parts of 2-imino-3-(1-naphthoyl-methyl)-thiazolidine hydrobromide, 30.8 parts of acetic anhydride, 30.6 parts of dry pyridine and 750 parts of dry chloroform is stirred and refluxed for 15 hours. After cooling the reaction mixture is washed with diluted ammonium hydroxide solution. The chloroform layer is separated, dried over magnesium sulfate, filtered and evaporated. The residue is crystallized from 32 parts of toluene, filtered off and dried, yielding 2-(acetyl-imino)-3-(1-naphthoyl-methyl)-thiazolidine; M.P. 104–122.5° C.

To a cooled (0° C.) and stirred suspension of 18 parts of 2 - (acetylimino)-3-(1-naphthoyl-methyl)-thiazolidine in 400 parts of methanol is added 46 parts of sodium borohydride. The cooling-bath is removed and the mixture is stirred for one hour at room temperature. The solvent is evaporated. The residue is treated with water and then extracted with chloroform. The extract is dried over magnesium sulfate, filtered and evaporated. The solid residue is recrystallized from 80 parts of toluene, filtered off again and dried, yielding dl-2-(acetyl-imino) - 3-[2-hydroxy-2-(1-naphthyl)-ethyl]-thiazolidine; M.P. 176–184° C.

To a stirred solution of 11.2 parts of dl-2-(acetyl-imino) - 3 - [2 - hydroxy-2-(1-naphthyl)-ethyl]-thiazolidine in 60 parts of dry chloroform is added dropwise 4.6 parts of thionylchloride at a temperature of 30° C. After the addition is complete, the whole is stirred for one hour at 30° C. Then there is added dropwise a solution of 14.7 parts of potassium carbonate in 40 parts of water at room temperature and after the addition is complete, the whole is further stirred for one hour at room temperature, followed by stirring and refluxing for 1 hr. 30 min. After cooling there is added 100 parts of water. The chloroform layer is separated, dried over potassium carbonate, filtered and evaporated. The oily residue is dissolved in 60 parts of boiling 2-propanol. To this hot solution is added a warm solution of 4.5 parts of oxalic acid dihydrate in 40 parts of 2-propanol. After cooling to room temperature, the precipitated product is filtered off and dried, yielding dl-2,3,5,6-tetrahydro-6-(1-naphthyl)-imidazo [2,1-b] thiazole oxalate; M.P. 175–182° C.

*Example LXIX*

A mixture of 57 parts of bromomethyl-2-nitro-phenyl-ketone, 23.5 parts of 2-amino-4,5-dihydro-thiazole and 240 parts of acetonitrile is stirred for 1 hr. 30 min. at room temperature. The formed precipitate is filtered off, washed with acetone and dried, yielding 2-imino-3-(2 - nitro - benzoyl-methyl)-thiazolidine hydrobromide; M.P. 188.4–191.4° C.

A mixture of 50 parts of 2-imino-3-(2-nitro-benzoyl-methyl)-thiazolidine hydrobromide, 61.2 parts of acetic anhydride, 61.2 parts of dry pyridine and 750 parts of dry chloroform is stirred and refluxed for 8 hours. After cooling the reaction mixture is washed with diluted ammonium hydroxide and with water. The organic layer is separated, dried over sodium sulfate, filtered and evaporated. The solid residue is recrystallized from toluene, to yield 2 - (acetyl - imino)-3-(2-nitro-benzoyl-methyl)-thiazolidine; M.P. 120–123.5° C.

A stirred suspension of 25 parts of 2-(acetyl-imino)-3-(2-nitro-benzoyl-methyl)-thiazolidine in 400 parts of methanol is cooled to 10° C. While maintaining the temperature between 10° and 20° C., there is added portionwise 4.6 parts of sodium borohydride. After the addition is complete, the whole is stirred for 1 hr. 30 min. The solution is filtered from some insoluble matter and the filtrate is evaporated. The residue is decomposed with water and extracted with chloroform. The extract is dried over potassium carbonate, filtered and evaporated. The semi-solid residue is crystallized from 48 parts of toluene, yielding dl - 2 - (acetyl-imino)-3-(β-hydroxy-2-nitro-phenethyl)-thiazolidine; M.P. 119–120° C.

To a stirred solution of 10 parts of dl-2-(acetyl-imino)-3-(β-hydroxy-2-nitro-phenethyl)-thiazolidine in 60 parts of dry chloroform is added dropwise 4.1 parts of thionylchloride at a temperature of 30° C. After the addition is complete, the whole is stirred for one hour at 30° C. Then there is added dropwise a solution of 13.4 parts of potassium carbonate in 40 parts of water at a temperature of about 25° C. (cooling in a water-bath) and after this addition is complete, the whole is stirred for one hour at room temperature, followed by stirring and refluxing for one hour. The reaction mixture is cooled and then there is added 150 parts of water. The chloroform layer is separated, dried over potassium carbonate, filtered and evaporated. The oily residue is dissolved in 80 parts of boiling 2-propanol. To this hot solution is added a warm solution of 3.5 parts of oxalic acid dihydrate in 40 parts of 2-propanol. After cooling to room temperature, the precipitated solid is filtered off, washed with acetone and dried, yielding dl - 2,3,5,6 - tetrahydro-6-(2-nitro-phenyl)-imidazo [2,1-b] thiazole oxalate; M.P. 173.5–175.5° C. (dec.).

*Example LXX*

A solution of 15 parts of dl-2,3,5,6-tetrahydro-6-(4-nitro-phenyl)-imidazo [2,1-b] thiazole hydrochloride in 200 parts of methanol is filtered over activated charcoal. The filtrate is added to 10 parts of a 30% 2-propanol/hydrochloric acid solution and the whole is hydrogenated at normal pressure and at room temperature in the presence of 3 parts of palladium-on-charcoal catalyst 10%. After the calculated amount of hydrogen is taken up (3 moles), hydrogenation is stopped. The catalyst is filtered off and the filtrate is evaporated, to yield dl-2,3,5,6-tetrahydro-6-(4-amino-phenyl)-imidazo [2,1-b] thiazole dihydrochloride; M.P. 245–250° C. (dec.).

*Example LXXI*

A mixture of 65 parts of bromomethyl-3-trifluoromethyl-phenyl-ketone, 25 parts of 2-amino-4,5-dihydrothiazole and 80 parts of 2-propanol is stirred for one hour at room temptrature. The precipitated product is filtered off, washed with 2-propanol and dried, yielding 2-amino-3-(3-trifluoromethyl-benzoyl-methyl)-thiazolidine hydrobromide; M.P. 259–263.5° C.

A mixture of 58 parts of 2-imino-3-(3-trifluoromethyl-benzoyl-methyl)-thiazolidine hydrobromide, 32 parts of acetic anhydride, 32 parts of dry pyridine and 750 parts of dry chloroform is stirred and refluxed for 8 hours. After cooling the reaction mixture is washed with ammonium hydroxide solution and then with water. The organic layer is separated, dried over magnesium sulfate, filtered and evaporated. The oily residue solidifies on treating with 48 parts of toluene. The solid is filtered off, washed with toluene and dried, yielding 2-(acetyl-imino)-3 - (3-trifluoromethyl-benzoyl-methyl)-thiazolidine; M.P. 108–109° C.

To a solution of 30 parts of 2-(acetyl-imino)-3-(3-trifluoromethyl-benzoyl-methyl)-thiazolidine in 400 parts of methanol is added portionwise 5.7 parts of sodium borohydride at 0° C. After the addition is complete, the cooling-bath is removed and the whole is stirred for one hour at room temperature. The solvent is evaporated. The residue is decomposed with water and extracted with chloroform. The extract is dried over magnesium sulfate, filtered and evaporated. The solid residue is recrystallized from 64 parts of toluene, to yield dl-2-(acetyl-imino) - 3 - (β-hydroxy-3-trifluoromethyl-phenethyl)-thiazolidine; M.P. 142–143° C.

To a stirred suspension of 22 parts of dl-2-(acetyl-imino) - 3 - (β-hydroxy-3-trifluoromethyl-phenethyl)-thiazolidine in 120 parts of dry chloroform is added dropwise 8.6 parts of thionylchloride at a temperature below 30° C. After the addition is complete, the whole is stirred for one hour at room temperature. Then there is added dropwise at room temperature a solution of 27.5 parts of potassium carbonate in 80 parts of water and the whole is stirred for one hour, followed by stirring and refluxing for one hour. After cooling the reaction mixture, there is added 100 parts of water. The chloroform layer is separated, dried over potassium carbonate, filtered and evaporated. The oily residue is dissolved in 48 parts of 2-propanol. To this solution is added 2-propanol previously saturated with gaseous hydrogen chloride. The precipitated solid is filtered off (filtrate is set aside) and dried, yielding a first fraction of dl-2,3,5,6-tetrahydro-6 - (3 - trifluoromethyl-phenyl)-imidazo [2,1-b] thiazole hydrochloride; M.P. 173–179° C.

The mother-liquor is evaporated. The solid residue is recrystallized from a mixture of 40 parts of methanol and 120 parts of ether, yielding, after filtration, a second pure fraction of dl - 2,3,5,6 - tetrahydro - 6-(3-trifluoromethyl-phenyl)-imidazo [2,1-b] thiazole hydrochloride; M.P. 173–174.5° C. To the latter mother-liquor (methanol/ether filtrate) is added 240 parts of ether, whereupon a solid is precipitated. It is filtered off and dried, yielding a third fraction of dl-2,3,5,6-tetrahydro-6-(3-trifluoromethyl-phenyl)-imidazo [2,1-b] thiazole hydrochloride; M.P. 171–174° C.

*Example LXXII*

An aqueous solution of 21 parts of dl-1,2-diamino-3-phenylpropane dihydrochloride in 25 parts of water is alkalized with sodium hydroxide and extracted with 20 parts of ethanol. The precipitated sodium chloride is filtered off and to the filtrate is added successively 15 parts of water and 13 parts of carbon disulfide and the whole is stirred for one hour at 100° C. (oil-bath). Then there is added one part of concentrated hydrochloric acid and the whole is further stirred for 10 hours at 100° C. After cooling the precipitated product is filtered off, washed with water and recrystallized from 240 parts of 4-methyl-2-pentanone, yielding dl-2-mercapto-4-benzyl-2-imidazoline; M.P. 152–154.5° C.

A suspension of 7.5 parts of dl-2-mercapto-4-benzyl-2-imidazoline, 1.15 parts of lithiumamide in 160 parts of xylene is stirred and refluxed for 15 minutes. After cooling the mixture is added to a solution of 10.4 parts of 1,2-dibromo-ethane in 40 parts of xylene. After the addition is complete, the whole is stirred and refluxed for 30 minutes. Then there is added 10 parts of pyridine and the whole is further stirred and refluxed for another 30 minutes. After cooling the reaction mixture, there is added successively 100 parts of water and 20 parts of ammonium hydroxide. The aqueous layer is separated and extracted twice with chloroform. The combined organic layers are dried over magnesium sulfate and evaporated in vacuo. The oily residue is dissolved in 2-propanol and to this solution is added 2-propanol previously saturated with gaseous hydrogen bromide. The precipitated product is filtered off and dried in vacuo, yielding dl-2,3,5,6-tetrahydro-6-benzyl-imidazo [2,1-b] thiazole hydrobromide; M.P. 200–205.5° C.

*Example LXXIII*

To a stirred mixture of 66.6 parts of 2,3,4-trichloro-acetophenone in 225 parts of dry chloroform is added portionwise 48 parts of bromine (exothermic reaction: temperature rises from 20° to 35° C.). After the addition is complete, the whole is stirred for 15 minutes at room temperature. The reaction mixture is washed successively with water, sodium hydrogen carbonate and water. The chloroform layer is dried over magnesium sulfate and filtered. The filtrate is evaporated, yielding 2,3,4-trichloro-phenacylbromide, which is used without further purification for the next step.

A mixture of 90.7 parts of 2,3,4-trichloro-phenacylbromide, 30 parts of 2-amino-4,5-dihydro-thiazole and 160 parts of 2-propanol is stirred for one hour at room temperature. The precipitated product is filtered off, washed with 2-propanol and dried, yielding 2-imino-3-(2,3,4-trichloro-benzoylmethyl)-thiazolidine hydrobromide; M.P. 282–283° C.

A mixture of 53.5 parts of 2-imino-3-(2,3,4-trichloro-benzoylmethyl)-thiazolidine hydrobromide, 27 parts of acetic anhydride, 27 parts of dry pyridine and 750 parts of dry chloroform is stirred and refluxed for 7 hours. After cooling the reaction mixture is washed successively with diluted ammonium hydroxide solution and with water. The organic layer is separated, dried over magnesium sulfate, filtered and evaporated. The oily residue is crystallized from 60 parts of toluene, yielding a first fraction of 2-(acetyl-imino)-3-(2,3,4-trichloro-benzoyl - methyl)-thiazolidine; M.P. 128.5–170.5° C. (dec.).

The mother liquor is evaporated. The residue is crystallized from 40 parts of toluene. The obtained solid is filtered off, boiled for a few minutes in 80 parts of hexane, filtered off while hot and dried, to yield a second fraction of 2 - (acetyl-imino)-3-(2,3,4-trichloro-benzyl - methyl)-thiazolidine; M.P. 122.5–126° C.

To a stirred and cooled (0° C.) suspension of 21.5 parts of 2-(acetyl-imino)-3-(2,3,4-trichloro-benzoyl - methyl)-thiazolidine in 400 parts of methanol is added portionwise 4.6 parts of sodium borohydride. The mixture is allowed to come to room temperature and then stirred for one hour. The whole is filtered and the filtrate is evaporated. The residue is treated with water and extracted with chloroform. The extract is dried over magnesium sulfate, filtered and evaporated. The oily residue is crystallized from 40 parts of toluene. The solid is filtered off and dried, yielding dl-2-(acetyl-imino)-3-($\beta$-hydroxy-2,3,4 - trichloro - phenethyl) - thiazolidine; M.P. 156–156.5° C.

To a stirred solution of 11.5 parts of dl-2-(acetyl-imino)-3-($\beta$-hydroxy-2,3,4-trichloro - phenethyl) - thiazolidine in 75 parts of dry chloroform is added dropwise 4.2 parts of thionylchloride at a temperature below 30° C. After the addition is complete, the whole is stirred for one hour at room tempераutre. Then there is added dropwise a solution of 13.8 parts of potassium carbonate in 50 parts of water at room temperature. After this addition is complete, the whole is stirred and refluxed for one hour. The mixture is cooled and there is added 50 parts of water. The chloroform layer is separated, dried over magnesium sulfate, filtered and evaporated. The oily residue solidifies on treating in acetone. The precipitated solid is filtered off and dried, yielding a first fraction of dl-2,3,5,6-tetrahydro-6-(2,3,4-trichlorophenyl)-imidazo [2,1-b] thiazole hydrochloride; M.P. 244.5–254° C.

The mother liquor (acetone filtrate) is evaporated. The residue is dissolved in 250 parts of diluted hydrochloric acid. To this solution is added activated charcoal and the whole is stirred and heated for a few minutes. The charcoal is filtered off while hot and after cooling the filtrate to room temperature, a second fraction is precipitated. It is filtered off and dried, yielding dl-2,3,5,6-tetrahydro-6-(2,3,4-trichlorophenyl) - imidazo [2,1-b] thithiazole hydrochloride; M.P. 261.5–264° C.

The latter mother-liquor is alkalized and extracted with toluene. The extract is dried over magnesium sulfate, filtered and evaporated. The oily residue is dissolved in 40 parts of acetone and gaseous hydrogen chloride is introduced into the solution. The precipitated solid is filtered off and dried, yielding a third fraction of dl-2,3,5,-6-tetrahydro-6-(2,3,4 - trichlorophenyl)-imidazo [2,1-b] thiazole hydrochloride; M.P. 261.5–264° C.

*Example LXXIV*

A mixture of 43.5 parts 4-(2-bromo-acetyl)-fluorobenzene, 20 parts 2-amino-thiazole and 160 parts 2-propanol is stirred and refluxed for one hour in a water-bath. After cooling the reaction mixture, the formed precipitate is filtered off, washed with 2-propanol and dried, yielding 2-imino-3-[(4 - fluoro-benzoyl)-methyl]-thiazoline hydrobromide; M.P. 235–237.5° C.

To a mixture of 50 parts 2-imino-3-[(4-fluoro-benzoyl)-methyl]-thiazoline hydrobromide and 320 parts methanol are added portionwise 12 parts sodium tetrahydridoborate, while keeping a temperature of 0° C. (ice-bath). After the addition is complete (slightly exothermic reaction), the mixture is stirred for one hour at room temperature. The precipitated solid is filtered off and the filtrate is evaporated. The combined solids are stirred for 10 minutes with 175 parts hydrobromic acid 25%. The precipitated salt is filtered off, washed with 2-propanol and dried, yielding dl-2-imino-3-[2-hydroxy-2-(4-fluoro-phenyl)-ethyl] thiazoline hydrobromide; M.P. 196–203° C.

A mixture of 10 parts dl-2-imino-3-[2-hydroxy-2-(4-fluoro-phenyl)-ethyl]-thiazoline hydrobromide, 75 parts acetic anhydride and 15 parts thionylchloride is stirred and refluxed for 30 minutes. Then a second portion of 10 parts thionylchloride is added and the whole is stirred and refluxed for another 30 minutes. The formed acetylchloride is distilled off in an oil-bath at a temperature of about 160° C. in the course of about 2 hours. The solvent is evaporated. The oily residue is treated with 200 parts water and 10 parts diluted hydrochloric acid. The whole is boiled with activated charcoal, filtered and the filtrate is alkalized with ammonium hydroxide and extracted with toluene. The extract is dried and evaporated. The oily residue is dissolved in 80 parts boiling 2-propanol. To this hot solution is added a warm solution of 3.6 parts oxalic acid dihydrate in 80 parts 2-propanol. After cooling to room temperature, the precipitated solid oxalate is filtered off and dried, yielding dl-5,6-dihydro- 6-(4-fluoro - phenyl)-imidazo [2,1-b] thiazole oxalate; M.P. 168–173° C.

*Example LXXV*

A mixture of 13.5 parts 4-nitro-phenacylbromide, 7.1 parts 2-(acetyl-amino)-thiazole and 80 parts toluene is heated in a sealed tube for about 96 hours at a temperature between 105–115° C. The formed precipitate is filtered off, washed with boiling toluene and recrystallized from 120 parts methanol, yielding 2-(acetyl-imino)-3-(4-nitro-benzoyl-methyl)-thiazoline hydrobromide; M.P. 216–218° C.

To a cooled (0° C.) solution of 11 parts 2-(acetyl-imino)-3-(4-nitro-benzoyl-methyl) - thiazoline hydrobromide in 80 parts methanol are added portionwise 2.3 parts sodium tetrahydridoborate at a temperature below 5° C. After the addition is complete, the mixture is stirred for one hour at room temperature. The formed precipitate is filtered off, washed with diluted ammonium hydroxide solution and dried, yielding dl-2-(acetyl-imino)-3-(β-hydroxy - 4 - nitro-phenethyl)-thiazoline; M.P. 238–246°, C.

24 parts thionylchloride are cooled to 0° C. While maintaining the temperature below 10° C., there are added 11 parts dl-2-(acetyl-imino)-3-(β-hydroxy-4-nitro-phenethyl)-thiazoline. After the addition is complete, the whole is stirred for 2 hours at room temperature. Then there are added 75 parts acetic anhydride at a temperature belowe 15° C. After this addition is complete, the whole is heated in an oil-bath for 2 hours at a temperature of 136° C., during which time the excess acetylchloride is removed. The solvent is evaporated. The residue is dissolved in a mixture of 150 parts water and 15 parts diluted hydrochloric acid. This solution is filtered, alkalized with ammonium hydroxide solution and extracted with toluene. The extract is dried over sodium sulfate, filtered and evaporated. The oily residue is dissolved in 80 parts boiling 2-propanol. To this hot solution is added a warm solution of 3 parts oxalic acid dihydrate in 40 parts 2-propanol: an oil is precipitated. The solvent is decanted (oily residue is set aside) and after keeping at room temperature, a solid oxalate is formed. It is filtered off and dried, yielding a first fraction of dl-5,6-dihydro-6-(4-nitro-phenyl)-imidazo [2,1-b] thiazole oxalate; M.P. 157–158° C. The oily residue, which was set aside, is crystallized from 120 parts methanol. The solid is filtered off and dried, yielding a second fraction of dl-5,6-dihydro-6-(4-nitro-phenyl)-imidazo [2,1-b] thiazole oxalate; M.P. 156–157.5° C.

*Example LXXVI*

5 parts of water are added to a stirred, cooled solution of 5 parts of dl-6-phenyl-2,3,5,6-tetrahydro-imidazo [2,1-b] thiazole in 40 parts of 2-β-methoxyethylpyridine. There is thus obtained a solution which, after suitable dilution, is suitable for oral administration to animals, and, after sterilization, is suitable for parenteral administration to animals, for the treatment of helminthiasis.

*Example LXXVII*

A mixture of 4 parts of hydroxylamine hydrochloride and 1 part of the sodium salt of ethylenediamine tetraacetic acid is dissolved in 400 parts of water, and the solution is cooled. The solution is stirred and 120 parts of sulphuric acid are slowly added. 360 parts of 2-β-methoxyethylpyridine and 36 parts of dl-6-phenyl-2,3,5,6-tetrahydro-imidazo [2,1-b] thiazole hydrochloride are then added successively to the stirred solution. The final volume of the solution is adjusted to 1000 ml. by the addition of water. There is thus obtained a drench suitable for oral administration to animals for the treatment of helminthiasis.

*Example LXXVIII*

An aqueous solution containing 100 parts of 2-β- methoxyethylpyridine and 15 parts of dl-6-phenyl-2,3,5,6-tetrahydro-imidazo [2,1-b] thiazole hydrochloride is administered orally at a dose of 100 mg./kg. (of body weight) of 2-β-methoxyethylpyridine and 15 mg./kg. (of body weight) of dl-6-phenyl-2,3,5,6-tetrahydro-imidazo [2,1-b] thiazole hydrochloride to sheep carrying infestations of Haemonchus spp., Ostertagia spp., Trichostrongylus spp., Cooperia spp., Nemadodirus spp., Oesophagostomum spp., Trichuris spp. and Chabertia spp. The animals are sacrificed 7 days after being dosed, and post-mortem examination shows that the percentage reduction in worm burden of each species is between 95% and 100% compared with untreated control animals.

What is claimed is:

1. An imidazo [2,1-b] thiazole selected from the group consisting of

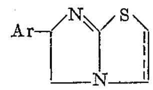

and the therapeutically acceptable acid addition salts thereof, wherein the dotted line between the 2- and 3-positions of the imidazo [2,1-b] thiazole nucleus represents an optional bond and Ar is a member selected from the group consisting of thenyl, furyl, phenyl, halophenyl, nitrophenyl aminophenyl, trifluoromethylphenyl, naphthyl and benzyl, provided that, when said Ar is benzyl, a saturated bond exists between the 2- and 3-positions of the imidazo [2,1-b] thiazole nuclus.

2. dl-5,6-dihydro-6-(2-thienyl)-imidazo [2,1-b] thiazole hydrochloride.

3. dl-5,6-dihydro-6-phenyl-imidazo [2,1-b] thiazole.

4. The therapeutically acceptable acid addition salts of dl-5,6-dihydro-6-phenyl-imidazo [2,1-b] thiazole.

5. dl-5,6-dihydro-6-(3-halophenyl)-imidazo [2,1-b] thiazole.

6. dl-5,6-dihydro - 6-(3-nitro-phenyl) - imidazo [2,1-b] thiazol oxalate.

7. dl-2,3,5,6-tetrahydro-6-phenyl-imidazo [2,1-b] thiazole.

8. The therapeutically acceptable acid addition salts of dl-2,3,5,6-tetrahydro-6-phen-imidazo [2,1-b] thiazole.

9. dl-2,3,5,6-tetrahydro-6-(3-halophenyl)-imidazo [2,1-b] thiazole.

10. dl-2,3,5,6-tetrahydro-6-(3-nitro-phenyl)-imidazo [2,1-b] thiazole oxalate.

References Cited by the Examiner

UNITED STATES PATENTS

| | | | |
|---|---|---|---|
| 2,775,538 | 12/1956 | Boskamp | 167—55 |
| 2,799,617 | 7/1957 | Forrest et al. | 167—55 |
| 2,969,369 | 1/1961 | Krimmel | 260—306.7 |
| 3,147,273 | 9/1964 | Szmuszkovicz | 260—306.7 |

HENRY R. JILES, *Acting Primary Examiner.*

JULIAN S. LEVITT, *Examiner.*

ALTON D. ROLLINS, SAM ROSEN, *Assistant Examiners.*

UNITED STATES PATENT OFFICE

CERTIFICATE OF CORRECTION

Patent No. 3,274,209 September 20, 1966

Alfons Herman Margaretha Raeymaekers et al.

It is hereby certified that error appears in the above numbered patent requiring correction and that the said Letters Patent should read as corrected below.

Column 1, line 25, for "anl" read -- and --; column 7, line 20, for "3-propanol" read -- 2-propanol --; line 60, for "washer" read -- washed --; column 14, line 38, for "5-parts" read -- 75 parts --; column 16, line 71, for "90.5-91°C." read -- 90.5-91.5° C. --; columns 17 and 18, Compound II, under the heading "No. of sheep", first column, reading down, for "2 1 1" read -- 2 2 1 --; column 26, line 28, for "m.p. 261.5-264° C." read -- 255-256.5° C. --; column 28, line 37, for "nuclus" read -- nucleus --; line 50, for "phen" read -- phenyl --.

Signed and sealed this 29th day of August 1967.

(SEAL)
Attest:

ERNEST W. SWIDER
Attesting Officer

EDWARD J. BRENNER
Commissioner of Patents